United States Patent
Pettersson et al.

(10) Patent No.: US 9,114,493 B2
(45) Date of Patent: Aug. 25, 2015

(54) WORKING TOOL POSITIONING SYSTEM

(75) Inventors: Bo Pettersson, London (GB); Juerg Hinderling, Marbach (CH); Benedikt Zebhauser, Rorschach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 128 days.

(21) Appl. No.: 14/006,093

(22) PCT Filed: Mar. 22, 2012

(86) PCT No.: PCT/EP2012/055155
§ 371 (c)(1),
(2), (4) Date: Sep. 18, 2013

(87) PCT Pub. No.: WO2012/127018
PCT Pub. Date: Sep. 27, 2012

(65) Prior Publication Data
US 2014/0007442 A1 Jan. 9, 2014

(30) Foreign Application Priority Data
Mar. 23, 2011 (EP) ................................ 11159457

(51) Int. Cl.
*B23Q 17/22* (2006.01)
*B25H 1/00* (2006.01)

(52) U.S. Cl.
CPC ............. *B23Q 17/22* (2013.01); *B25H 1/0092* (2013.01)

(58) Field of Classification Search
CPC ..... B23Q 17/002; B23Q 17/22; B25H 1/0092
USPC ............ 33/262, 263, 286, 334, 628, 638, 642
See application file for complete search history.

(56) References Cited

U.S. PATENT DOCUMENTS

| 7,331,113 B1 * | 2/2008 | Patrick et al. ................... 33/286 |
| 7,742,176 B2 | 6/2010 | Braunecker et al. |

(Continued)

FOREIGN PATENT DOCUMENTS

| CN | 100580373 C | 1/2010 |
| CN | 101836077 B | 3/2014 |
| DE | 101 16 015 A1 | 10/2002 |
| DE | 20 2004 018 003 U1 | 2/2005 |
| DE | 10 2009 014 301 A1 | 10/2009 |
| DE | 10 2008 042 349 A1 | 4/2010 |
| EP | 1249291 | 10/2002 |
| EP | 1275470 | 1/2003 |
| EP | 1517117 | 3/2005 |
| GB | 2 358 926 A | 8/2001 |

OTHER PUBLICATIONS

European Search Report dated Sep. 5, 2011 as received in Application No. EP 11 15 9457.

*Primary Examiner* — G. Bradley Bennett
(74) *Attorney, Agent, or Firm* — Maschoff Brennan

(57) ABSTRACT

A method and system for determining the position of a handheld power tool on a wall including measuring distances within a plane perpendicular to a tooling axis in at least two directions, comprising at least the direction to one side wall and the direction to the floor or the ceiling. At least one non-contact measurement sensor module measures distances in a multitude of angles in an angular range of at least 1° around the at least two directions. From the distance sequence measured by the at least one measurement sensor module a calculation and storing unit automatically calculates a function, wherein extrema represent shortest distances to walls, floor and/or ceiling adjacent to the wall. From said function the calculation and storing unit deduces the shortest distances, and output means provide information about the shortest distances so as to allow positioning relative to the shortest distances.

27 Claims, 13 Drawing Sheets

(56) References Cited

U.S. PATENT DOCUMENTS

| | | |
|---|---|---|
| 8,269,984 B2 | 9/2012 | Hinderling et al. |
| 8,422,035 B2 | 4/2013 | Hinderling et al. |
| 2002/0162978 A1 | 11/2002 | Butler et al. |
| 2002/0164217 A1* | 11/2002 | Peterson ..................... 408/1 R |
| 2004/0093749 A1* | 5/2004 | Wu ............................... 33/286 |
| 2005/0261870 A1* | 11/2005 | Cramer et al. ................ 702/166 |
| 2009/0260239 A1* | 10/2009 | Cerwin ........................... 33/286 |
| 2011/0063438 A1 | 3/2011 | Fuchs et al. |
| 2011/0114345 A1* | 5/2011 | Schlesak et al. .................. 173/1 |
| 2011/0318122 A1* | 12/2011 | Montplaisir et al. ............ 408/16 |
| 2013/0189041 A1* | 7/2013 | Abe et al. ........................... 408/5 |
| 2014/0323279 A1* | 10/2014 | Miyamoto ........................ 483/1 |

\* cited by examiner

| γ (°) | d (mm) |
|---|---|
| -8 | 3022.2 |
| -7 | 3015.2 |
| -4 | 3000.0 |
| -1 | 3006.9 |
| 0 | 3007.3 |

WORKING TOOL POSITIONING SYSTEM

FIELD OF THE INVENTION

The present invention relates to a method and system to determine a position of a hand-held power tool.

BACKGROUND

Traditionally, for the positioning of a hand-held power tool on a wall, separate measuring components or devices are needed. These can be tachymeters, laser rotators, line lasers, electronic distance meters such as the Leica Disto, or simple analogue metering devices. Nevertheless, in order to save time, it would be advantageous for a craftsman to be able to position a hand-held power tool, for example a power drill, an electric screwdriver or a pneumatic nail gun on a wall without the need of a separate measuring device.

Inside of a room or building for the positioning of a tool on a wall usually it is sufficient to know the distances or the span to the walls on the right and on the left, and those to the floor and to the ceiling. In the conventional case, for example when the room is of cubical form, the wall is rectangular and the adjacent walls, floor and ceiling are perpendicular to this wall. In this case, knowing above mentioned distances would also allow to establish a local coordinate system to position the tool relative to a reference point, e.g. by nulling the coordinates on a distinct location at the wall and deriving relative coordinates in a system with axes parallel to the walls, the floor and the ceiling.

Conventionally, this problem would be solved by mounting distance sensors on the tool that allow measurements to the walls, floor and ceiling in parallel, i.e. those distance sensors mounted perpendicularly. This, however, forces the operator to align the tool in a way that the sensors are aligned exactly perpendicularly to the walls. If there is no indicator such as a vial showing the operator the correct levelling of the instrument, the system has to automatically detect the plumb line direction and align the range sensors accordingly.

Alternatives can be solutions with broadcasters for positioning, such as Nikon's optical indoor positioning system iSite/iGPS or Locata's pseudolite-based positioning system. Those have the disadvantage of being dependent on additional equipment and a complex setup.

There are some documents in prior art that describe distance measurement perpendicular to the tooling direction by devices that are fixedly mounted on the tool and not rotating.

EP 1 275 470 B1 describes a manually guided support for a handheld tool and means for sensing the position of this support.

In DE 20 2004 018 003 U1 a positioning system fixed on a handheld power tool is disclosed that measures distances in two directions, horizontally and vertically, thus determining a position of the tool on a wall.

EP 1 249 291 B1 not only discloses a distance measurement perpendicular to the tooling direction by a device that is fixedly mounted on the tool, it also describes a solution that determines the shortest distance to the floor by a distance measurement that swings around the direction of gravity, the found minimum representing the shortest distance to the floor. This is realized by a freely rotating sensor or deflection means with asymmetrically distributed weight that is oscillating in a scan range. EP 249 291 B1 also discloses the use of an accelerometer sensor to determine the plumb line direction.

The solutions disclosed in these documents all make use of fixed distance measuring sensors, which forces the operator to exactly align the tool for the measurement.

EP 1 517 117 A1 discloses a method and system for determining the spatial position of a hand-held measuring appliance, which is not designed to be placed on a hand-held power tool. For this purpose at least two reference points are needed that are detected by a scanning laser beam. By measuring angles and distances between these reference points and the measuring appliance the actual position of the appliance can be deduced.

SUMMARY

It is therefore an object of the present invention to provide an enhanced positioning system for electric power-driven hand tools, such as a power drill, that precisely and reliably detects the position of this tool on a wall without forcing the operator to exactly align the tool or to place reference points in the room. Another object of the present invention is to allow detecting the position even if the room is asymmetrical, e.g. in case that one adjacent wall and the floor or the ceiling are missing, blocked, uneven, sloped or mirroring.

The positioning system is mounted or mountable on an electric power-driven hand tool (in the following simply referred to as "tool") and comprises at least one distance measuring device with a measurement sensor module, which can measure the distances or angles in a sector of at least 270°, in particular at least 360°, or a sub-range thereof, and a calculation and storing unit that generates a discrete function, wherein the minima represent the shortest distances to the walls, the floor and the ceiling adjacent to the wall to be tooled. Instead of measuring angles, it is also possible to measure only distances as a time sequence.

The measurement sensor module can either be a classical electronic distance meter (EDM) using a laser or infrared beam, or a multi-target waveform digitizer (WFD). Also laser fans could be used for the determination of the shortest distance. In this case the angular information is deduced by a multi-receiver arrangement or by a waveform analysis of the multiple return signal.

To measure the distances in an angle of at least 360°, the positioning system or parts of it—e.g. at least one measurement sensor module—can be mounted on the tool rotatably around an axis perpendicular to the wall one wants to tool. In case of a power drill the axis perpendicular to the wall would be the drilling axis. The measurement sensor then is mounted in such a way that—e.g. in case of a laser distance measuring device—the measurement beam can be sent out with a high frequency. The beam then by rotation over 360° defines a plane perpendicular to the drilling axis—or, in other words, parallel to the wall one wants to drill into. This could be visually generated with a laser rotator comparable to the Leica Rugby. Alternatively, at least two, in particular three or four, measurement sensor modules can be mounted on the body of the tool, in such a way that together they cover an angle of at least 360°.

In both ways, the measured distances result in a discrete function versus emission angle or time stamp, the maxima representing the corners and the minima representing the shortest distances to the walls, the floor and the ceiling. In the conventional case of a simple cubic room those minima would always lead to a coordinate system with one axis directed to the plumb line direction. Nonetheless, this axis cannot be identified unambiguously, if the operator holds the tool in an unconventional way, e.g. 180° turned, i.e. oppositely compared to the normal posture, or arbitrarily tilted under certain circumstances, for instance when drilling next to an edge of the wall.

Thus, for assigning each minimum to the correct wall a gravity indicating device is added to surely determine how the power drill is held by the operator. The minimum representing the floor then can be recognized by the direction of the plumb line, and the coordinate system is unambiguously oriented. This gravity indicating device can be an accelerometer, such as an LIS203DL by ST Microelectronics, or a 360° gravity oriented inclinometer or tilt switch. The gravity indicating device is aligned to a defined angle reference of the rotating laser distance measuring device. The angle reference can be a zero point of an angle sensor or simply the initial point of a time sequence triggering the distance measurements.

To make the rotating laser beam visible simplifies the perpendicular positioning of the tool with regard to the wall to be tooled and thus the aligning of the measuring plane parallel to this wall. Alternatively, a vial can be attached to the tool to assist the operator in aligning the tool. In another alternative embodiment the measuring module can comprise a mechanical aid, such as a pluggable frame or a similar construction, e.g. with at least three points, which, when placed onto the wall, align the tool perpendicularly to the wall.

The rotation of the measurement sensor module—respectively the whole distance measuring device or a part of it, e.g. the sensor or a mirror, prism or deflection element—can be either finite or infinite. A finite rotation—e.g. of 400°—has the advantage of easier realization of transmitting power, as it is possible to use cables instead of contact rings. Also, if necessary, transmission of distance measurement beam light via fibers is possible. In the case of infinite rotation a contact-free power transmission could be also realized by integrating energy harvesting, i.e. the unit does not need any external power. One way to realize this is to connect some magnets to the chuck, which holds the drill, and to place a coil on the rotating device with the sensor. One gets an AC signal out of the coil, which can be used to power the measurement device or to load accumulator elements. A second way is to supply power or load accumulators via the contactless direct drive using the same inductive power transmission technique.

As for the definition of a local 2D coordinate system either a single wall, preferably the floor or the ceiling and one corner, or two perpendicular walls, e.g. a side wall and the ceiling, are sufficient, optionally one can choose, which surface of the room defines the orientation of the coordinate axis and which point is origin or reference of that axis. This is useful in case that the room has no roof or one of the walls is irregular or mirroring: windows or glass fronts can result in laser distance measurement problems, i.e. in mirroring the opposite wall. In case of irregular walls or special constructions disturbing the measurement to the walls, thus disallowing to derive the shortest distances or the local coordinate system, those irregularities also can be determined and displayed as a 2D cross-sectional view originating in the tool's position for defining—either automatically or via user input—subsequentially minimally two or maximally four wall or angle sections used for measuring.

Also small obstacles such as nails or ladders or mountings at the wall one wants to drill into, as well as dynamic disturbances such as persons passing by, must get calculated somehow out of the discrete function of the processed distances of the rotating EDM. As soon as these obstacles are detected as relevant disturbing objects due to significant deviation from the plane or straight line information, a warning is provided or, in case the system comprises a display, measuring options are offered.

Drilling into the ceiling or the floor consequently requires horizontal measuring and results in two additional problems. Firstly, a reference orientation provided by the plumb line is not available, and secondly, especially the floor normally experiences more obstacles than walls—such as the operator's legs, furniture, pillars, etc.

In this case the operator has to work parallel to a single wall for subsequent positioning and may use additional information in the direction perpendicular to the disturbed one, e.g. from a drawn line or wire or from a laser line.

As, especially in the case of a power drill, dust can become a hazard for the optical elements of the electronic distance meter, the tool can be equipped with an aspirator or, if the measurement mode is separate in time from the tooling mode—in case of a power drill the drilling—the optics are mechanically protected, e.g. by a cap, in a home position during the tooling mode.

Another possible feature of the positioning system is described in the European Patent Application with the filing number 10192628.5. There, a rotational laser is used to determine from a multitude of vertical planes that very plane, which is perpendicular to two parallel walls, by scanning the walls in an angle of a few degrees back and forth, in this way measuring the distance to a multitude of points on the walls. With this "vertical scan" the shortest distance can be found. In the direction of the shortest distance the plane then is perpendicular to the side wall.

When the tool with a positioning system according to the invention is positioned on the wall, a gravity sensing device or a circular bubble can help the tool operator to align the tool along two axes: the tooling axis, i.e. the longitudinal axis, and a horizontal or pitch axis perpendicular to the tooling axis. The additional "vertical scan" functionality is an option for an exact alignment of the tool also around a third axis: a vertical or yaw axis perpendicular to the tooling axis. The "vertical scan" can be used for the system of the present invention to determine whether the tool is aligned parallel to a side wall, respectively to both side walls. When the side walls (or at least one side wall) are known to be perpendicular with respect to the wall one wants to tool, the "vertical scan" can be used to determine whether the tool is aligned perpendicularly to the wall one wants to tool. This way it can be ensured that the distance to the side wall(s) is measured in the correct direction—exactly orthogonally to the side wall(s).

When the system according to the present invention is equipped with this feature, the "vertical scan" is performed as follows. After positioning the tool on the wall and aligning it along the two horizontal axes the operator has to perform a slight yaw motion with the tool, i.e. slightly pivot the tool to the left and/or to the right around a vertical axis. This can be done during the normal measuring or in a certain scanning mode, in which only the side walls are scanned, before the measuring itself takes place. Alternatively, the manual pivoting can also be replaced by an automatic scanning mode with a two-dimensional scanning of an area of the side wall. For this automatic scanning mode a sensor module, respectively an emitter-receiver device, must be provided that is designed to swivel not only vertically but also horizontally in a certain angle for the emulation of the yawing motion of the tool.

The system then in the manual case determines from the measured distances, in which orientation of the tool the distances to the walls are the shortest. In the case of automatic swivelling the system recognizes the horizontal angle between the tooling axis and the direction of the shortest distance(s) to the side wall(s) and from this angle deduces, in which orientation the tool would be parallel to the side wall(s). In both cases the operator is guided through output means to an exactly perpendicular alignment of the tool to the wall. Thus, not only the distance measurement to the side walls becomes more precise, the vertical scan also permits a more accurate perpendicular tooling, which can be important, e.g. when drilling deep holes into or through a wall.

The "vertical scan" functionality can be an additional feature for any of the embodiments described above or, as it is designed to determine shortest distances, can even be a stand-alone version. The "vertical scan" concept could also be altered to comprise a "horizontal scan" in order to align the tool also horizontally by scanning in the direction of the floor or the ceiling. It could also be used when tooling the ceiling or the floor.

BRIEF DESCRIPTION OF THE DRAWINGS

The invention will now be explained in detail by referring to exemplary embodiments that are accompanied by figures, in which.

DETAILED DESCRIPTION

Figure 1A:
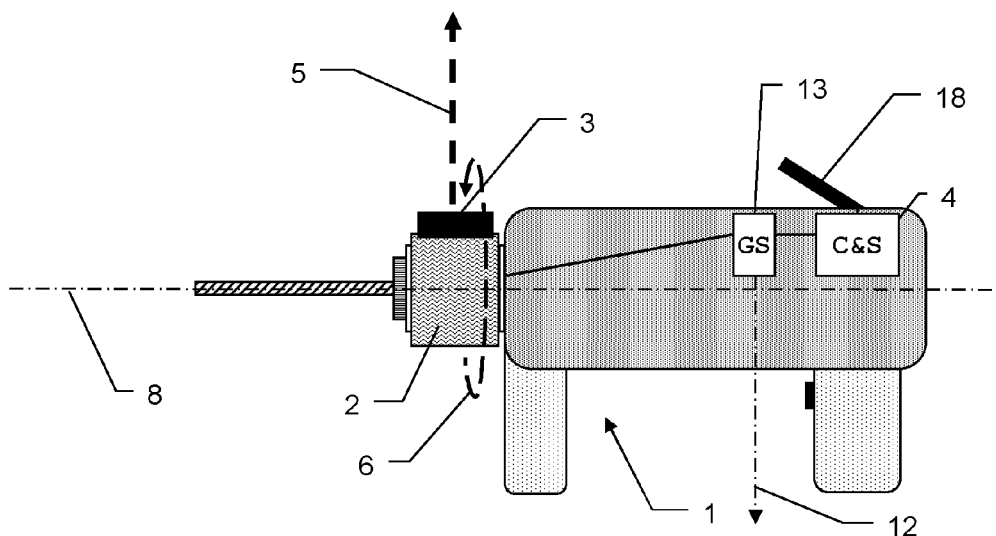
FIG. 1a-b show a schematic representation of a first embodiment of the positioning system according to the invention in side view and in front view.

A positioning system for a hand-held power tool 1 is provided. It comprises a distance measuring device 2 with a measurement sensor module 3, a plumb line indicator 13, a calculation and storing unit 4 and a display unit 18 for displaying calculated absolute or relative distances or local coordinates in a 2D-cross-sectional view 19.

Figure 1B:
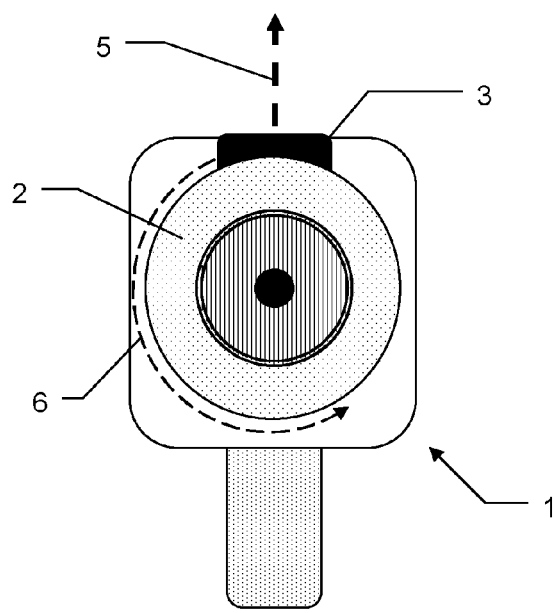

FIGS. 1a and 1b show a schematic representation of the first embodiment of the positioning system, wherein the measurement sensor module 3 is mounted on the distance measuring device 2 in such a way that the measurement beam 5 can be sent out with a high frequency and rotatably around the tooling axis 8. The beam 5 then by rotation 6 over 360° defines a plane 9 perpendicular to the tooling axis 8, i.e. parallel to the wall 22 one wants to drill into. The distances are recorded at regular time intervals where the initial trigger is given after a full turn of the measurement beam. Under the assumption of a constant speed of the rotation 6 these time intervals correspond to well defined angles. Alternatively, the angles corresponding to the distances could also be measured by a separate angle sensor. Finally, the sequence of distances versus angles builds up a 2D cross sectional profile of the environment or, alternatively, the two polar coordinates can be represented as a discrete function (as shown in FIGS. 5a-5d).

Figure 2A:
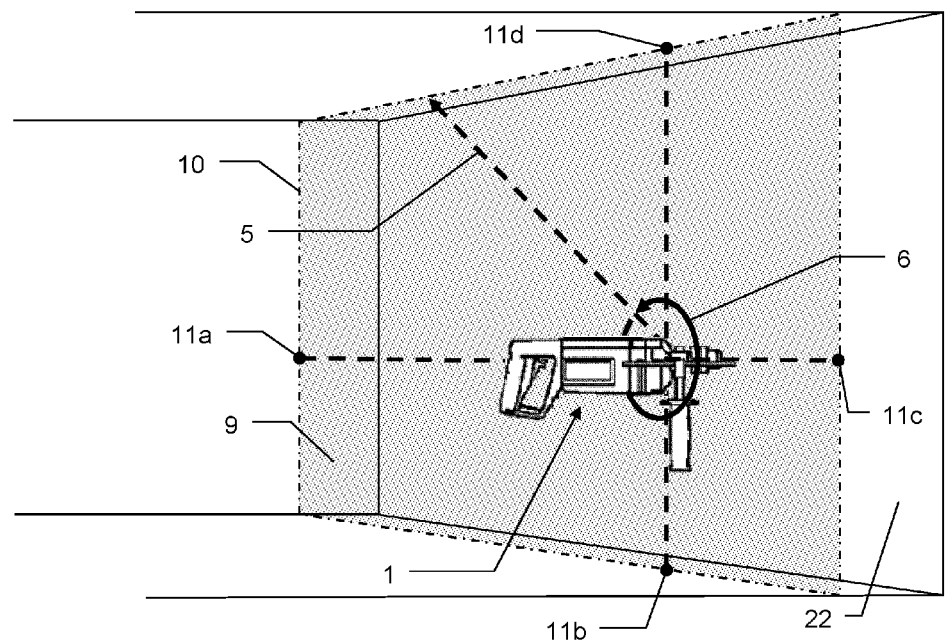
FIG. 2a-b show a schematic representation of a power drill as an example of a hand-held power tool equipped with the first embodiment of the positioning system and the plane created by the rotation of the measurement beam.
Figure 2B:
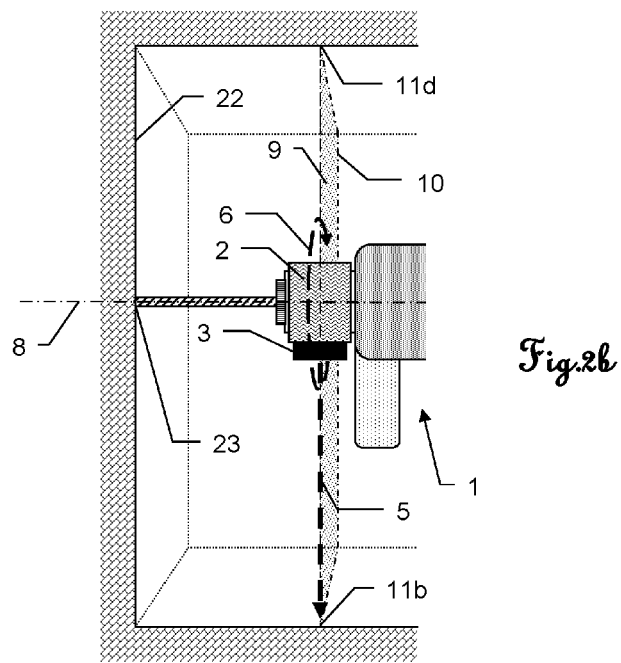

This working principle is illustrated in FIGS. 2a and 2b. These figures show a power drill as an example of a handheld working tool 1 equipped with the first embodiment of the positioning system according to the invention. The emitted rotating measurement beam 5 defines a plane 9 perpendicular to the drilling axis 8 and parallel to the wall 22, measuring the distances 11 to the edges 10 of the plane 9. The measured maxima represent the corners, the minima $11a'$-$11d'$ represent the shortest distances to the walls, the floor and the ceiling $11a$-$11d$.

Figure 3:
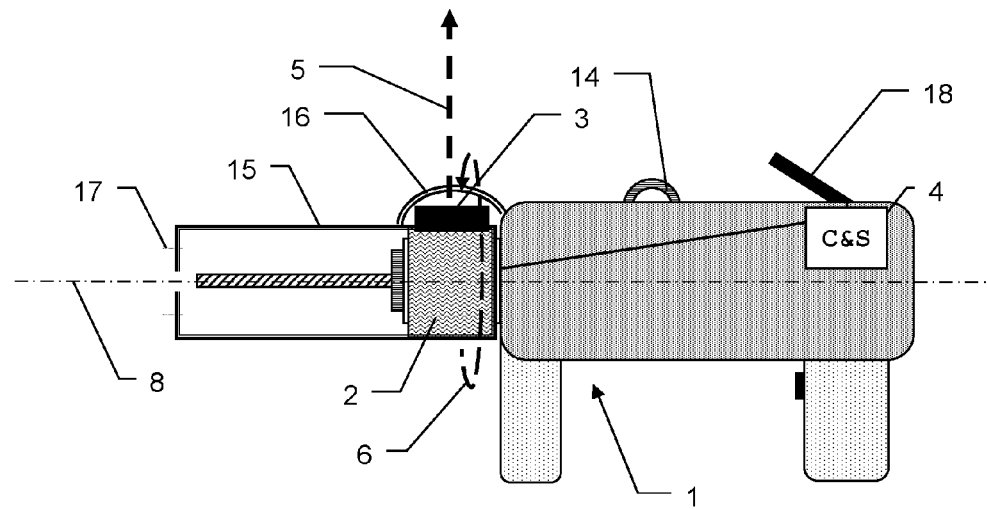
FIG. 3 shows a schematic representation of a first embodiment of the positioning system with additional, non-compulsory features in side view.

The plane 9 defined by the rotating measurement beam 5 can be made visible with a laser rotator, in order to enable the tool operator to position the tool 1 nearly perpendicular to the wall 22. Alternatives for the visible laser plane are shown in FIG. 3: also a circular bubble 14 or a pluggable frame 15, its front end having at least three points 17, can help the operator to align the tool 1. To protect the optics of the measurement sensor module 3 from dust, also a protection cap 16 or an aspirator can be provided.

Figure 4:
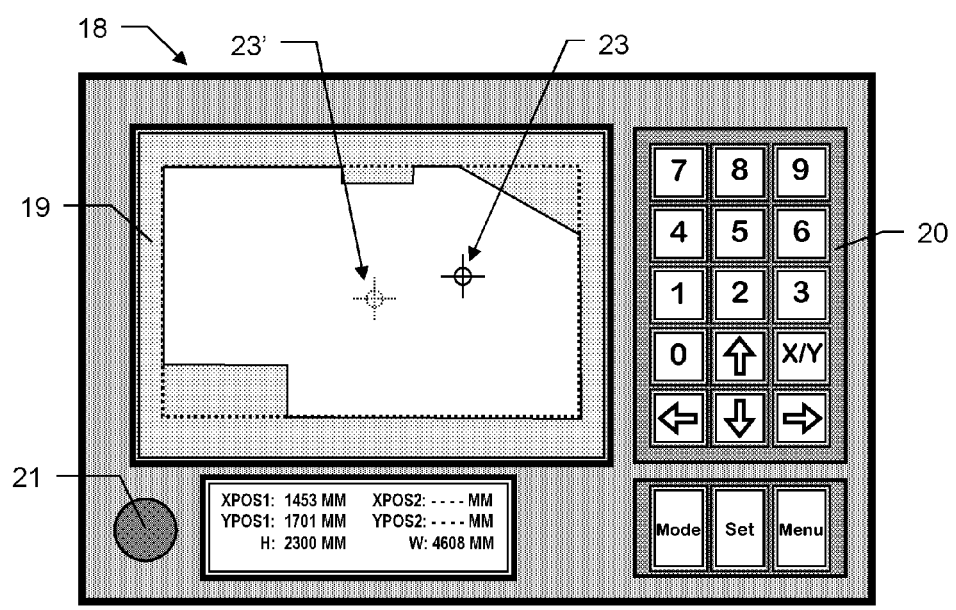
FIG. 4 shows a schematic representation of the control and/or display unit with input means and a speaker, displaying a 2D cross-sectional view.

FIG. 4 is a schematic representation of the control and display unit 18, comprising input means 20 and a speaker 21, and displaying a 2D cross-sectional view 19 derived from planning and/or measurement data in a local coordinate system and indicating the tool's position 23 on the wall 22. The input means 20 of the control and display unit 18 allow setting a reference point 23'—e.g. a zero point—of a locally defined coordinate system or defining arbitrary coordinate systems in the measuring plane 9, e.g. referencing to a corner of a room, and with coordinate axes defined in a way that one can easily derive measures from the floor, the ceiling or one of the walls. The input means 20 also allow inputting design data such as line or grid values or irregular "stake-out" points to be tooled subsequently. The tool operator is then guided to those points by indicating direction and distance measures on the display unit 18.

Optionally, the input means can be a touch screen, a USB interface or a wireless link. In case of configured and preloaded design data including a coordinate system, the design data can consist of single points to be "stake-out" or a profile or both. In one application, the measured distance sequences can be displayed together with the preloaded design to see differences between designed and real dimensions. The alignment of the local coordinate system of the power tool and that of the design data can be achieved by a Helmert transformation.

Figure 5A:
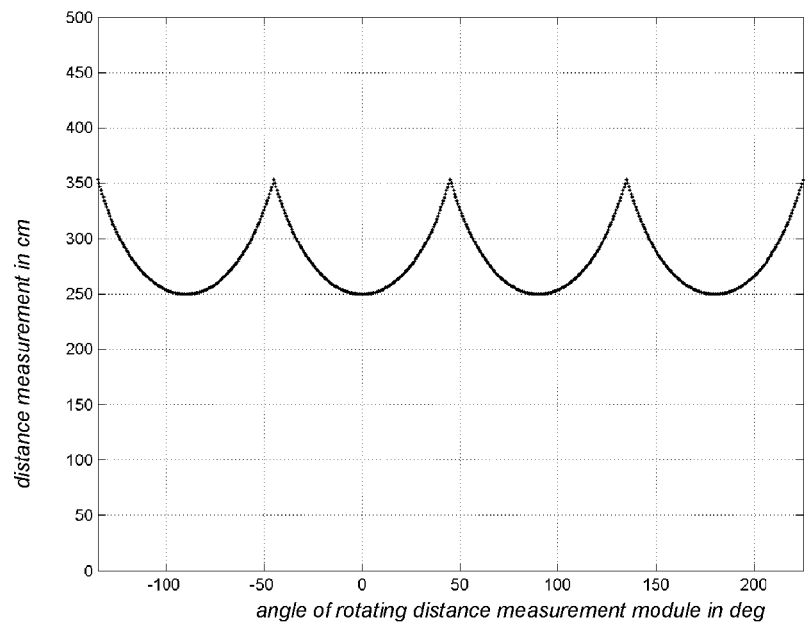
FIG. 5a-d show the shapes of different discrete functions generated by the first embodiment of the positioning system and representing the measured profile in polar-coordinates.
Figure 5B:
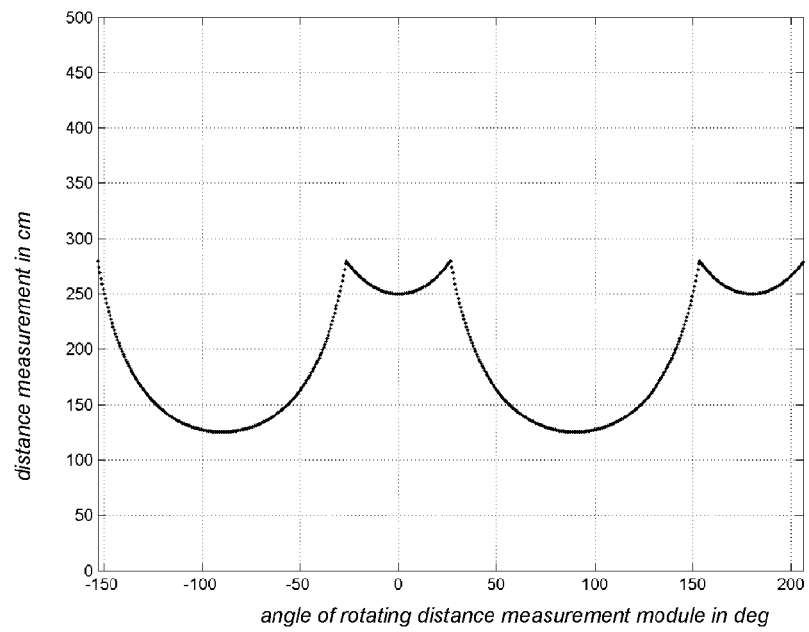
Figure 5C:
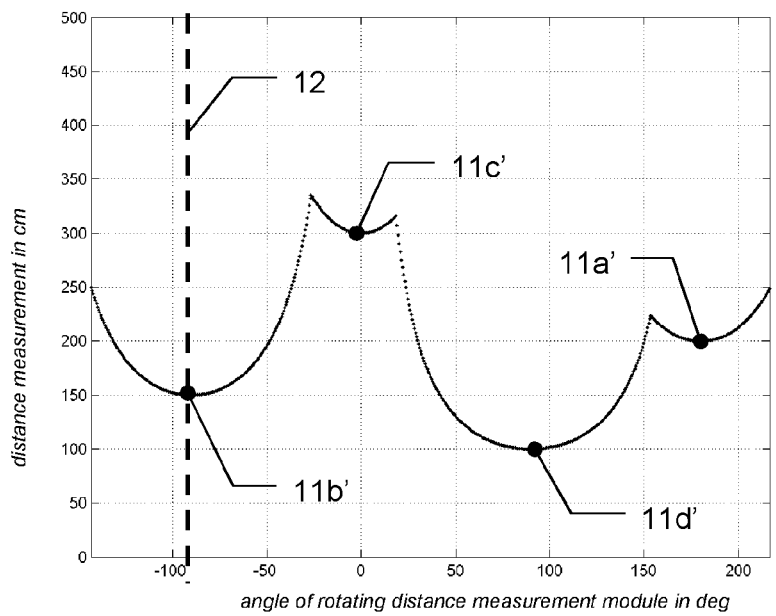
Figure 5D:
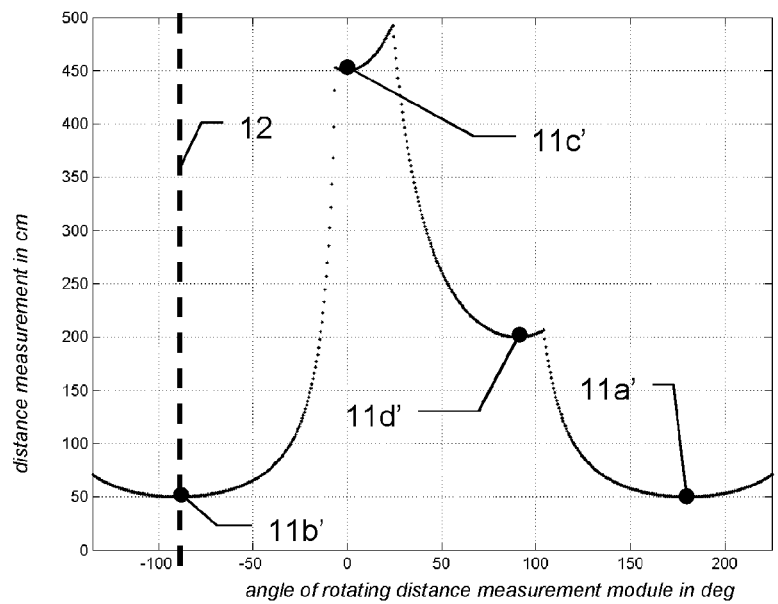

The measured distances are transformed into a discrete function 11' by the calculation and storing unit 4, the maxima representing the corners and the minima 11a'-11d' representing the shortest distances 11a-11d to the walls, floor and ceiling. Examples of the shape of possible discrete functions 11' are shown in FIGS. 5a-5d. FIG. 5a shows the shape of a discrete function 11' generated when the tool is placed in the centre of a squared wall with 5 m length and 5 m height; FIG. 5b shows this shape when the tool is placed in the centre of a rectangular wall with 5 m length and 2.5 m height.

The minimum 11b' that represents the shortest distance to the floor 11b can be recognized through the gravity sensitive device 13 indicating the plumb line 12, which is calibrated to a defined angle reference or trigger point of the rotating measurement sensor module 3. The other minima 11a', 11c', 11d' are then assigned to the corresponding distances 11a, 11c, 11d to the walls and the ceiling, depending on the rotation 6 being clockwise or counter-clockwise. This is shown in the FIGS. 5c and 5d: The former shows the shape of a discrete function 11' generated when the tool is placed eccentrically on a rectangular wall with 5 m length and 2.5 m height. The latter shows this shape when the tool is placed very eccentric near a corner on a rectangular wall with 5 m length and 2.5 m height. In both cases the plumb line 12 defines the minimum 11b', which represents the shortest distance to the floor 11b. Thus, when rotating counter-clockwise, in each diagram the second minimum from the left 11c' would represent the shortest distance to the right wall 11c, the third minimum 11d' that to the ceiling 11d, and the fourth minimum 11a' that to the left wall 11a.

In case of irregular walls or special constructions disturbing the measurement to the walls, thus disallowing to derive the shortest distances 11a-11d or the local coordinate system, those irregularities are determined and displayed on the display unit 18 as a 2D cross-sectional view 19 originating in the tool's position 23 for defining—automatically or via using the input means 20—subsequentially minimally two and maximally four areas used for measuring. Also small obstacles 24 such as nails or ladders or mountings at the wall one wants to drill into, as well as dynamic disturbances such as persons passing by are detected as significant deviation from plane or straight line information. In case of relevant disturbing objects 24 a warning is provided and measuring options are offered on the display 18.

In those cases, in order to increase the reliability, one can either use the plumb line 12 of the gravity sensitive device 13 in combination with an angle encoder or the knowledge of the layout of the room or previously generated data, e.g. in the form of point-clouds that beforehand have been recorded by a mini-scanner.

Figure 6A:
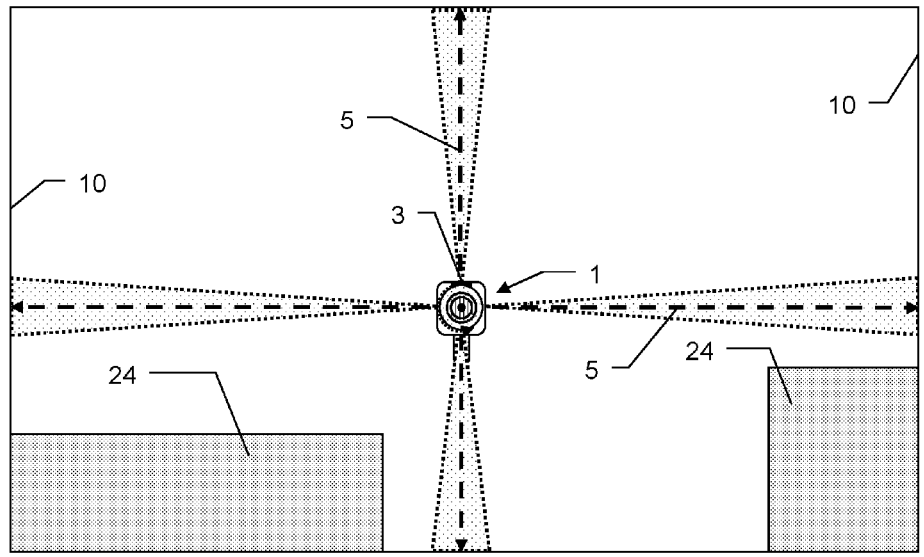
FIG. 6a-c show a schematic representation of a power drill as an example of a hand-held power tool equipped with the first embodiment of the positioning system in front view and the plane generated by the emitted rotating measurement beam.

The former solution includes the use of the gravity sensitive device 13 for a sufficiently accurate determination of the plumb line 12 in combination with an angle encoder. In this case one directly measures the distances 11 only at the angles 0°, 90°, 180° and 270° or in a segment of a few degrees around these angles, e.g. in a segment of 1° to 5°. This is shown in FIG. 6a.

The latter solution can be used for any room that has been digitized, e.g. by a laser scanner.

Figure 6B:
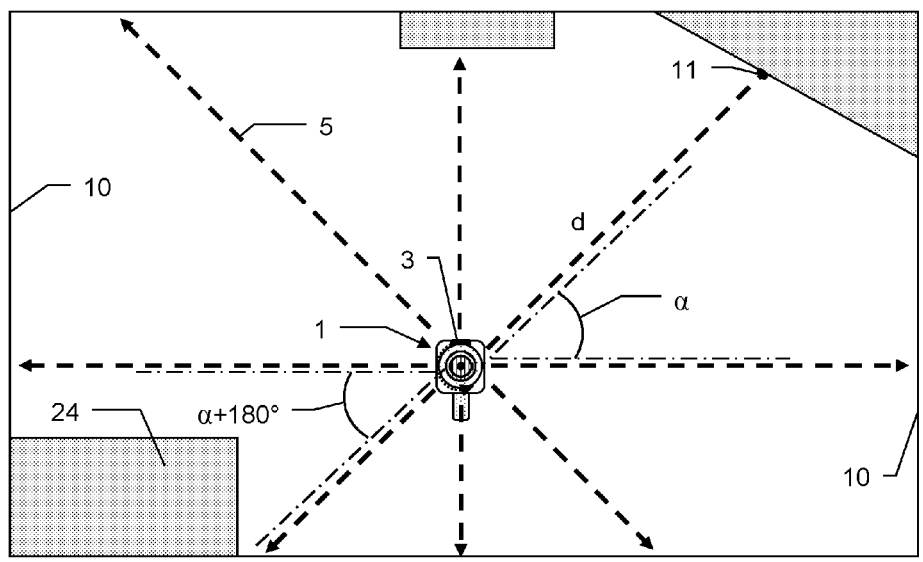
Figure 6E:
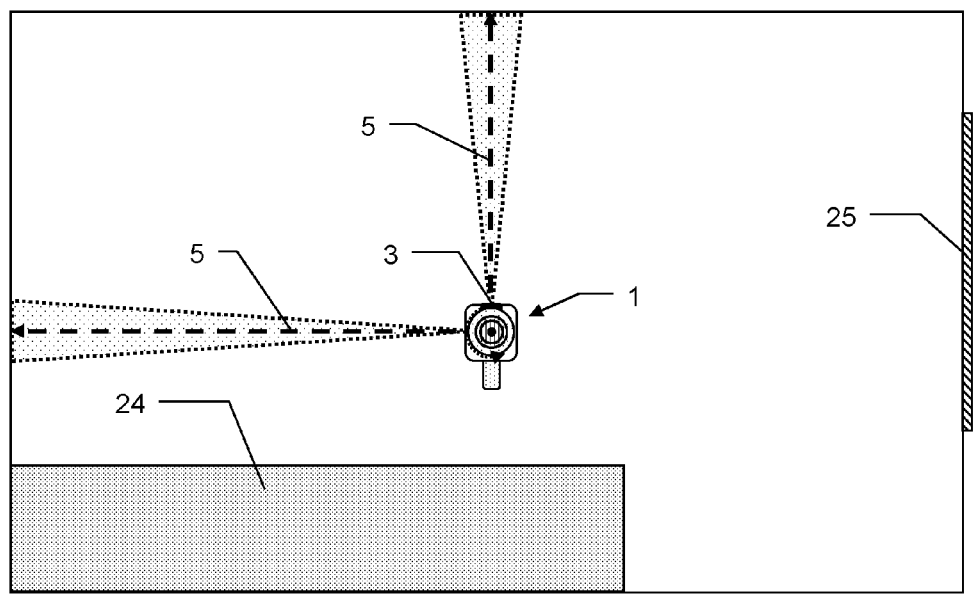

If the layout of the room is known to be regular, for instance cubical, then also simpler methods are possible. In this case the variation of the measured distance 11 would follow a cosine. Then redundancy is added by using the diametric distance for evaluating each angle $\alpha$ of distance measurement, i.e. by combining the distances measured at angle $\alpha$ with the complementary one measured at $\alpha+180°$. This is shown in FIG. 6b.

However, for the definition of a local 2D coordinate system two perpendicular walls are sufficient. Therefore, using the input means 20 the operator can choose to leave out one or more of the walls, floor or ceiling in the determination of the coordinates. This might be useful in case that the room has no roof or one of the walls is irregular or mirroring. FIG. 6c shows a power drill 1, equipped with the distance measuring device 2, in front of the wall to be tooled 22. An obstacle 24, e.g. a piece of furniture, and a window 25 each obstruct the measurement in one direction, the obstacle 24 by blocking the measurement of the shortest distance to the floor 11b, the window 25 by mirroring the measurement beam 5. The measurement, therefore, takes place in the other two directions only.

The rotation 6 of the distance measuring device 2 or parts of it can be performed either manually or driven by a motor. This motor preferably should be separate from the motor of the tool 1, e.g. the drilling motor, to enable measurement independent from drilling and to keep the tool 1 more stable and non-vibrating. In case of using the drilling motor there should be a gear for adapting the speed to the optimal one for that of distance measurements or a certain speed mode. In the case of an EDM module rotating as a whole around the axis 8, the movement is realized by a ring piezo drive, a direct drive or any other hollow core axis motor. The offset to the axis of rotation has to be taken into account in the calculation of the measured distance and the coordinates. Such a module nowadays can already get minimized to a size of 30×10×15 mm or less with a capability of measuring up to distances of 30 or 50 m with an accuracy in the millimetre range.

The distance measurement device 2 can be either integrated fixedly into the tool 1 or pluggable to it. In the latter case and in the case of a power drill the measurement device 2 could be placed around the drill chuck. After applying the drill into the chuck one plugs the concentric measuring adapter onto it and uses that in parallel to the drilling functionality as long as one does not have to change the drill.

As the measurement module or rather its optics cannot rotate around the axis of a working tool such as a power drill centrally—there is the driller and the drill chuck—it either has to rotate around this axis in a certain distance on a concentric ring or it has to be placed eccentrically.

Figure 7A:
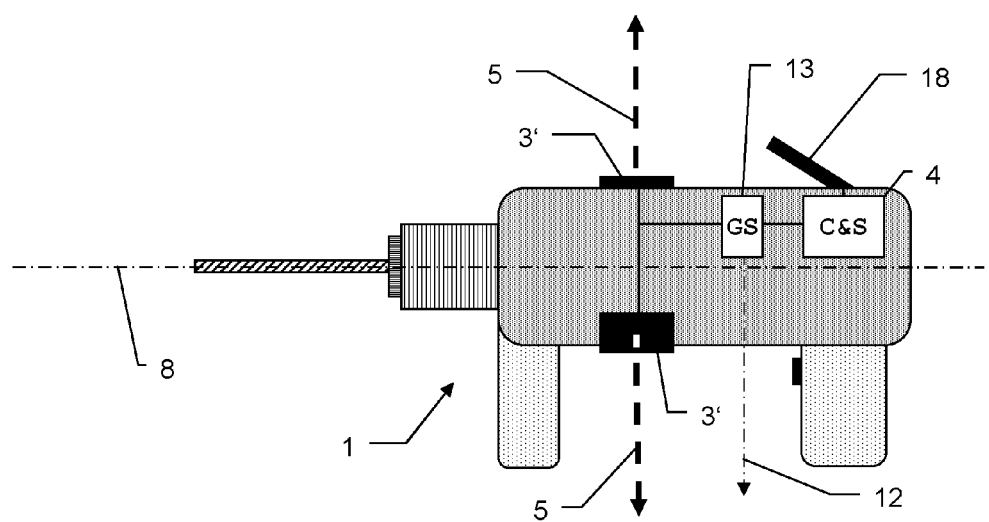
FIG. 7a-c show a schematic representation of a second embodiment of the positioning system according to the invention in side view and in front view.
Figure 7B:
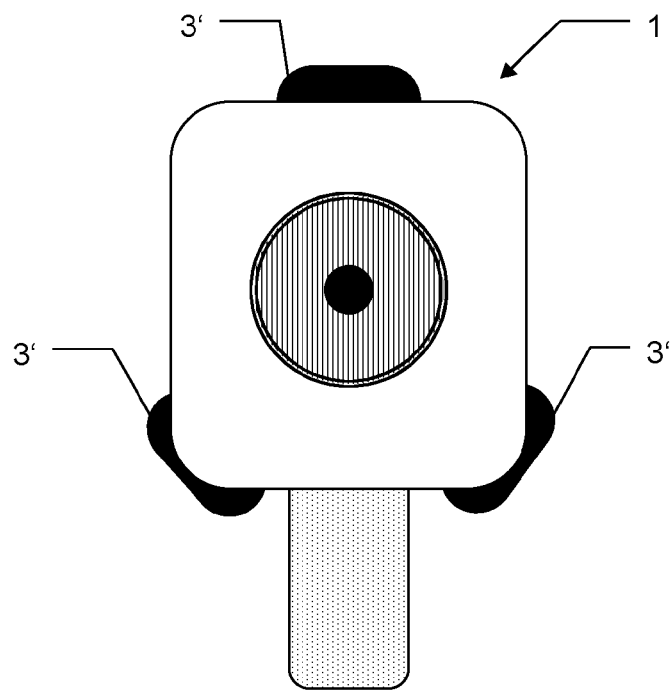
Figure 7C:
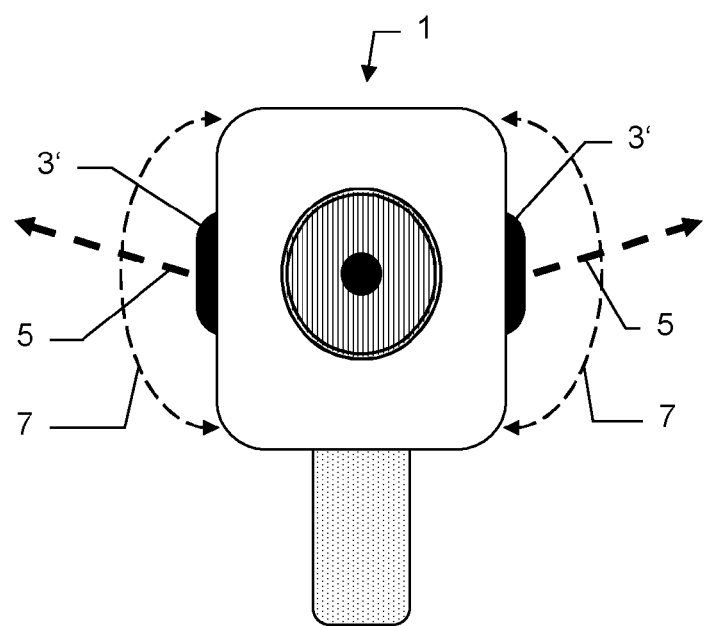

Some embodiments of the latter case are shown in FIGS. 7 and 8. Disadvantageously, here the driller or the drill chuck would be an obstruction for the rotating beam 5. This problem is solved by two or more fixed eccentric measurement sensor modules 3', each having a rotating deflection element, which covers an angle of at least 360° divided by the number of those modules 3'. In case of two modules 3' each one covers an angle of at least 180°, in case of three an angle of at least 120°. These elements are fixed above and below or left and right of the drill chuck or any part of the housing of the tool 1. The FIGS. 7a-c show embodiments of the positioning system comprising three, respectively two measurement sensor modules 3' fixed on the body of the working tool 1. The modulated or pulsed measurement beam 5 then can be sent out either with a rotation 6, an oscillation 7 or via fan lasers.

Figure 8A:
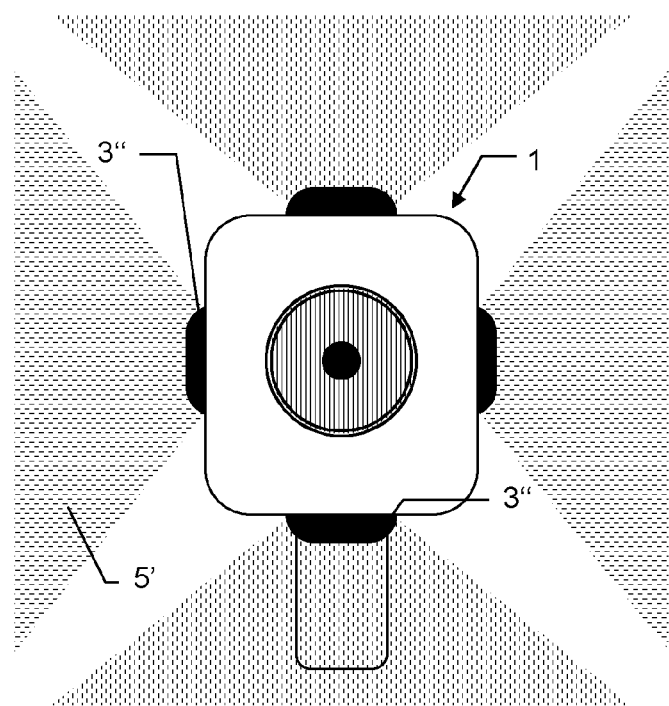
FIG. 8a-b show a schematic representation of a third embodiment of the positioning system according to the invention in front view.

FIG. 8a shows a further embodiment of the invention, comprising four fixedly mounted measurement sensor modules 3" using modulated laser fans 5' to target the distances 11 in the four directions without rotation 6 or oscillation 7 and without the necessity to hold the tool 1 exactly perpendicular to the wall 22. The angular resolution can be achieved by a structured receiver. For example a photodiode array with spacing of some few degrees can be used. The received laser signals of each photodiode will be transferred by a multiplexer to the EDM electronics for distance evaluation. The angular resolution is defined by the address of each photodiode. Therefore, also with this mechanically static arrangement a dynamically recorded profile of the walls and surfaces of the room can easily be captured.

Figure 8B:
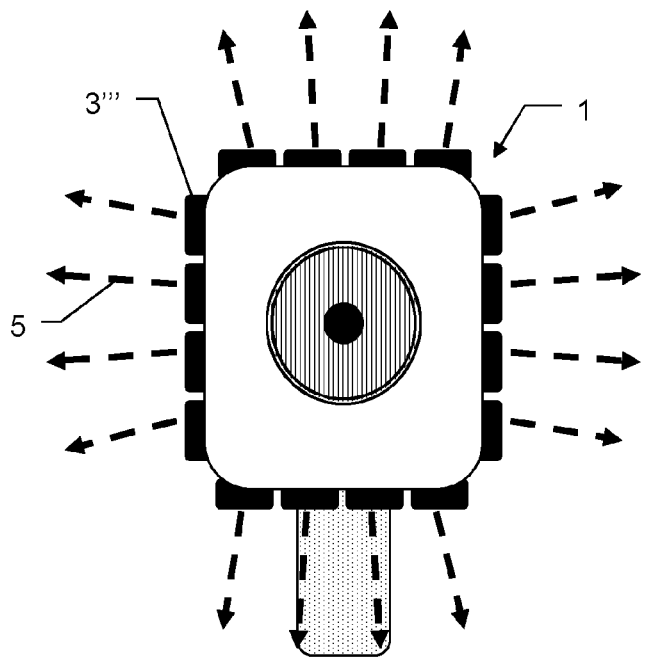

Alternatively, instead of four laser fans also a version comprising multiple emitter-receiver devices 3''' placed around the body of the working tool 1 is possible. This is shown in FIG. 8b. It uses LED or laser diodes as emitters and at least three wide-angle receivers or a multi-receiver arrangement. The measuring of the separate emitter-receiver devices 3''' can take place either parallel or successive. In the latter case the triggering or timing is managed on the emitter side. One after another of the emitters is activated to measure distances. In this case a "virtual rotation" 6' is performed electronically by stepping through all emitters around the power tool.

Figure 9:
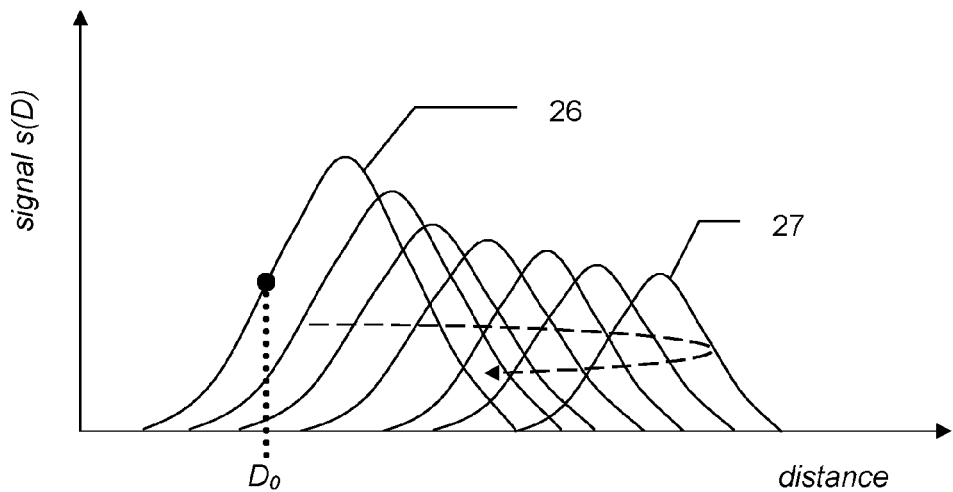
FIG. 9 shows the shape of a discrete function generated by the third embodiment of the positioning system equipped with multi-emitters and multi-receivers or with a waveform digitizer (WFD).

If the EDM is based on the WFD principle, then the sensor module 3'' does not need multiple receivers. The pulsed laser fan, projecting a line onto the surfaces, is reflected back into a wide angle receiver. The light echoes from the walls and obstacles temporarily overlap and generate a broadened signal pulse in the electronic receiver of the WFD range finder. An example of a signal generated by this embodiment is shown in FIG. 9. The received signal is typically but not necessarily the strongest when the surface of the reflecting object is perpendicular to the sent signal. However, the span to the nearest surface corresponds to the lefternmost curve 26. For the case shown, these objects are side walls, floor and ceiling adjacent to the wall 22, the lefternmost curve 26 represents the shortest distance 11a-11d within the associated angle sector and the righternmost curve 27 represents the most distant corner.

Figure 10A:
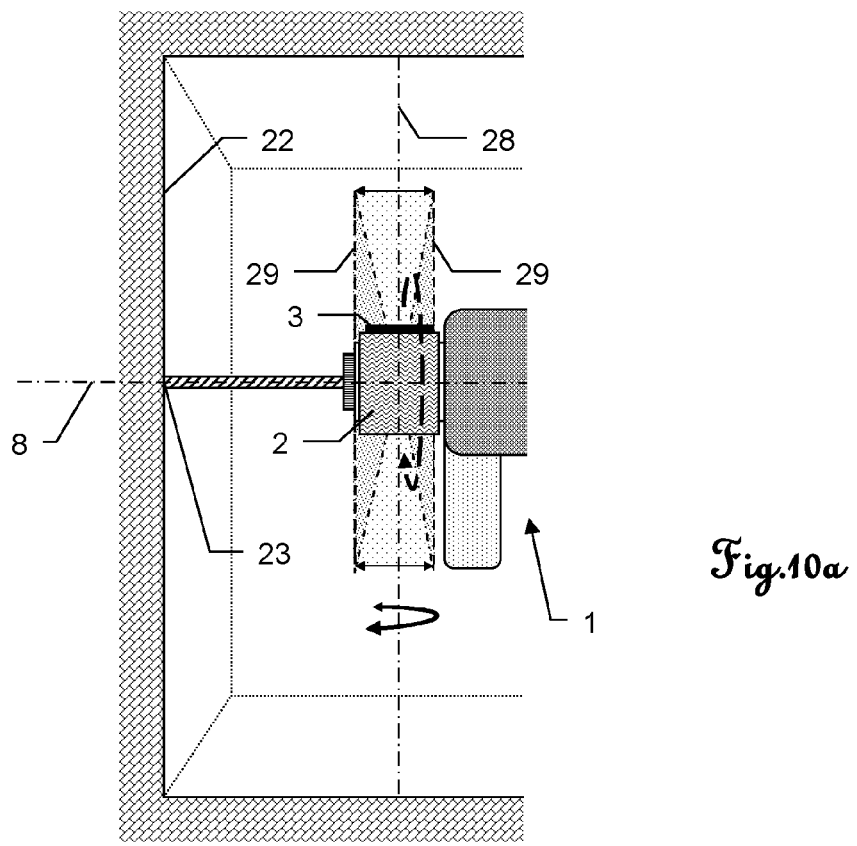
FIG. 10a-b show schematic representations of an embodiment of the positioning system with a "vertical scan" functionality performing a scan to a side wall.

FIG. 10a shows a representation of the first embodiment of the positioning system according to the invention, additionally comprising a vertical scan functionality. For performing a vertical scan on one or both of the walls perpendicular to the wall 22, there are two alternatives. In the first alternative the tool operator has to manually pivot the tool 1 slightly around the vertical axis 28. During the pivoting a measurement sensor module 3 then measures distances 31, 32, 33 to a multitude of points on a multitude of line segments 29, 30 on the side wall(s). The second alternative comprises a special scanning mode, in which a measurement sensor module 3 performs a two-dimensional scan to the side wall(s), thus simulating a pivot of the tool 1 around the vertical axis 28. Also in this mode the measurement sensor module 3 measures distances 31, 32, 33 to a multitude of points on a multitude of line segments 29, 30 on at least one of the side walls.

Figure 10B:
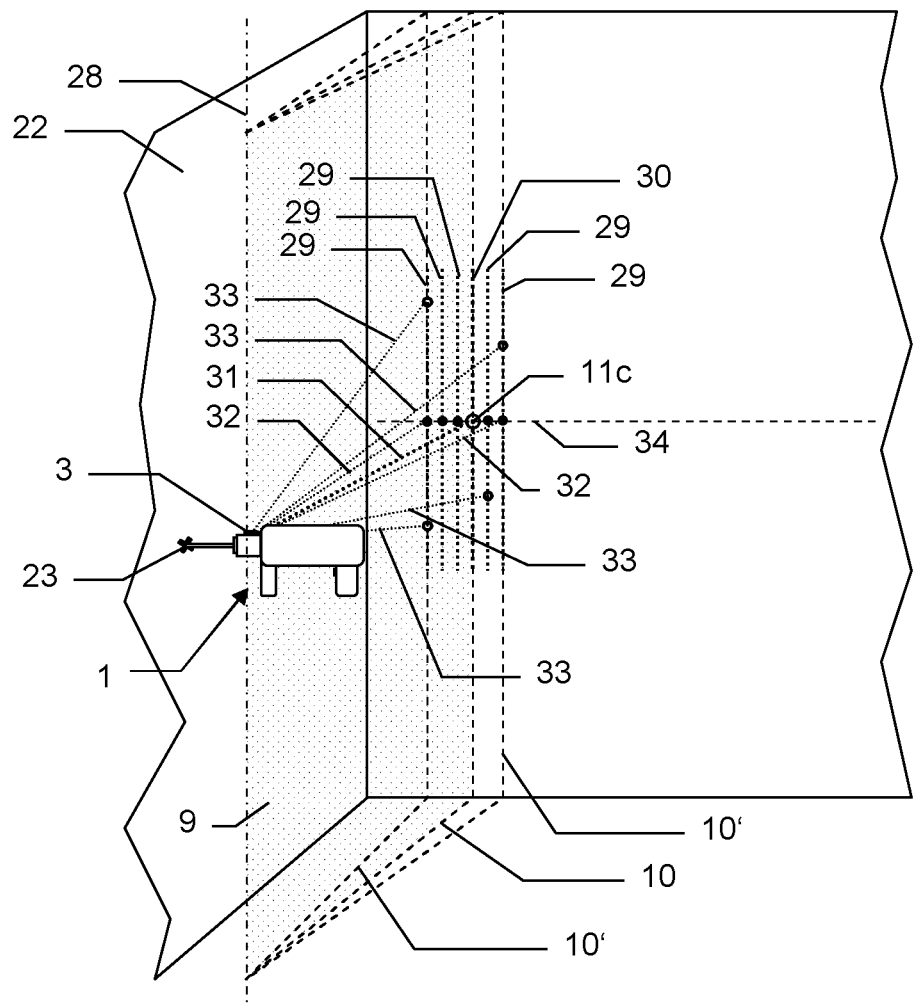

FIG. 10b shows a number of exemplary line segments 29, 30 with exemplary points, to which a distance 31, 32, 33 is measured, and shortest distances 31, 32 to the line segments 29, 30. These shortest distances 31, 32 are all measured at points on a horizontal line 34. In the conventional case the shortest distance 31 of all measured distances 31, 32, 33 typically corresponds with the shortest distance 11a, 11c to that wall. The line segment 30 with the shortest distance 31 therefore lies on the edge 10 of the correct plane 9 for distance measurement, which is parallel to the wall 22 to be tooled.

Figures 11A, 11B:
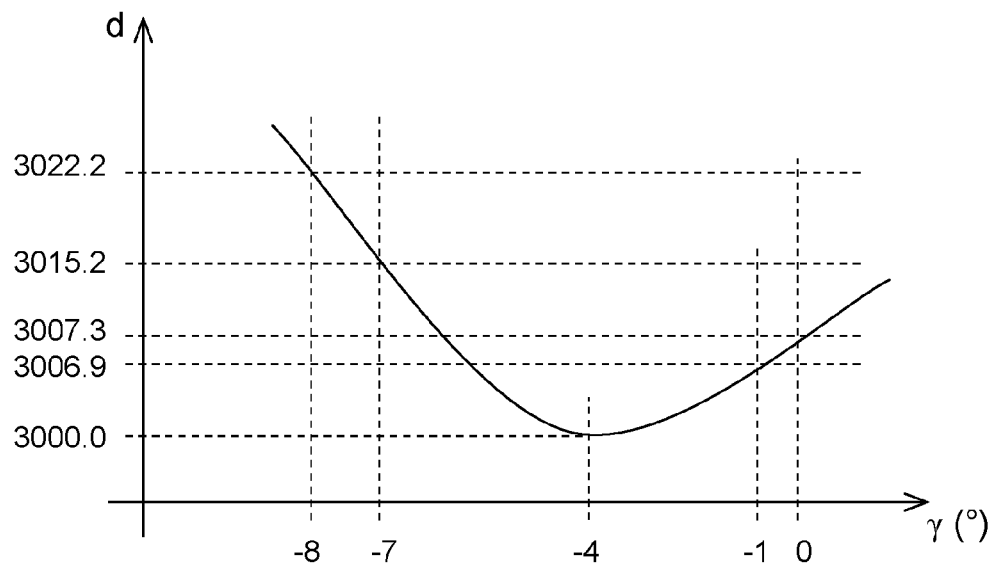
FIG. 11a-b show exemplary values measured by a "vertical scan" in diagram and tabulation.

FIG. 11a shows a diagram with an example of possible values 31', 32' representing the shortest distances 31, 32 measured for five line segments 29, 30 at different angles γ, with 0° being the output angle, i.e. the angle between the tooling axis 8 and the side wall at the beginning of the scan. FIG. 11b shows these values in a tabular form. The lowest value 31'—in this example a distance of 3000.0 mm at an angle γ of −4°— represents the shortest distance 31 to a point on the nearest line segment 30 and, consequently, the shortest distance 11a, 11c to the side wall. The number of line segments 29, 30 does not have to be limited to a number of five.

Figure 12:
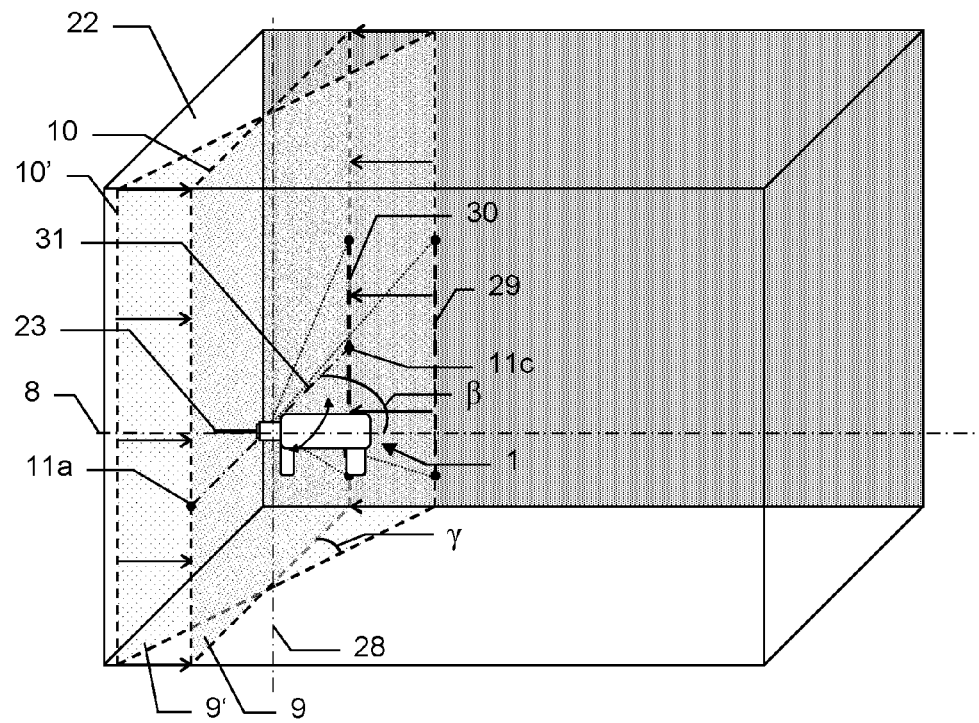
FIG. 12 shows a schematic representation of an embodiment of the positioning system and the alignment around a vertical axis of tool and plane through a "vertical scan".

FIG. 12 shows the pivot of a plane 9', which is not parallel to the wall 22, to the correct plane 9 for measurement being parallel to the wall 22. The operator is guided to the corresponding angle γ of the lowest measured value 31'—in this example to the value of 3000.0 mm at an angle of −4°— through output means, in particular a loudspeaker 21, indicating the correct alignment of the tool 1, respectively the angle β between the tooling axis 8 and the direction of the shortest distance 31 to a point on the nearest line segment 30 on the side wall. If this angle β is 90°, the tool 1 is aligned parallel to the side wall(s).

Figure 13:
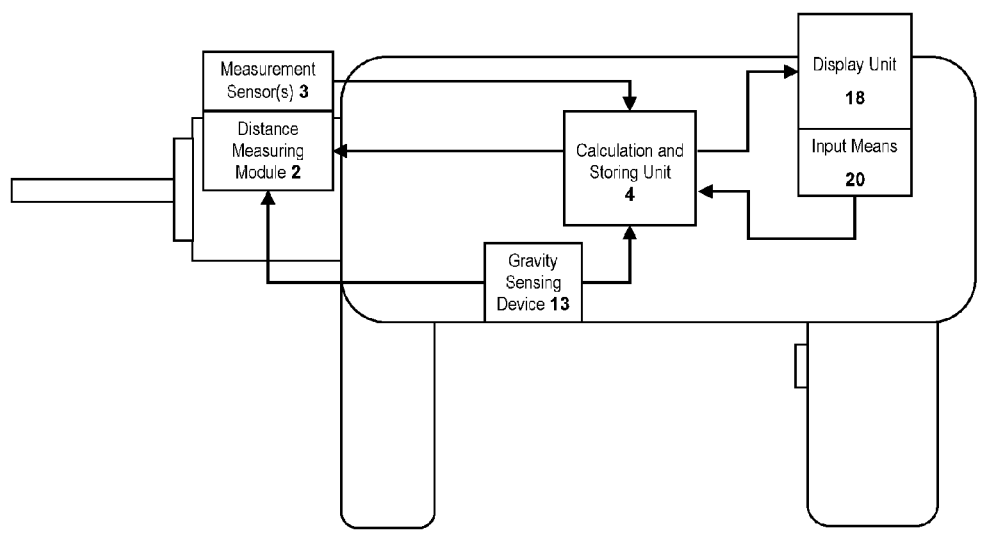
FIG. 13 shows a schematic representation of the data flow.

FIG. 13 shows a schematic representation of the data flow in the positioning system. The distance measuring module 2 and the measurement sensor(s) 3 are controlled by the calculation and storing unit 4. This unit 4 triggers emitters and/or receivers for distance measurement and manages the angle related synchronisation including the optional orientation given by the gravity sensing device 13. In case of a more modular system the real-time operating system stays at the calculation and storing unit 4, whereas the data application tasks are computed on a human interface module, comprising the display unit 18 and input means 20. This module initiates the measurement task, handles the data interfacing, the data processing and the graphical representations, e.g. the 2D-views 19 or surface profiles.

All components of the positioning system can be provided either mounted on the tool 1, e.g. integrated fixedly into the tool 1, or loose, e.g. as a pluggable upgrade kit. An upgrade kit can include all the necessary components of the positioning system and be pluggable to a tool 1 without a pre-installed positioning system. Alternatively, it can comprise optional components only and be pluggable to a tool 1 with an integrated positioning system according to the invention in order to provide additional features. Pluggable components preferably can be designed to be mountable to the tool 1 releasably, e.g. by quick-release means.

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for determining the position of a hand-held power tool on a wall by measuring distances within a plane perpendicular to a tooling axis in at least two directions, comprising:

at least one non-contact measurement sensor module in each of the at least two directions measures distances in a multitude of angles in an angular range of at least 1° around the at least two directions, the at least two directions comprising at least the direction to one wall adjacent to the wall and the direction to the floor or the ceiling adjacent to the wall;

from the distance sequence measured by the at least one measurement sensor module a calculation and storing unit automatically calculates a function, wherein extrema represent shortest distances to walls, floor and/ or ceiling adjacent to the wall;

from said function the calculation and storing unit deduces the shortest distances to walls, floor and/or ceiling adjacent to the wall; and output means that provide information about the shortest distances so as to allow positioning relative to the shortest distances.

2. A method according to claim 1, wherein the extrema is a minima.

3. A method according to claim 1, wherein the output means includes a display unit and/or acoustical output means.

4. A method according to claim 1, wherein the at least one measurement sensor module measures the distances within an angular range of at least 270°.

5. A method according to claim 1, wherein the at least one measurement sensor module measures the distances within an angular range of at least 360°.

6. A method according to claim 1, wherein the calculation and storing unit automatically defines a local coordinate system by means of the function.

7. A method according to claim 1, wherein a plumb line direction is determined, and the distances are measured only in an angular range around defined angles or angle sectors relative to the plumb line direction.

8. A method according to claim 1, wherein a plumb line direction is determined, and the distances are measured only in an angular range around defined angles or angle sectors relative to the plumb line direction around the angles of 0°, 90°, 180° and 270°, or two perpendicular of these, the angular ranges having a dimension of 1° to 15°.

9. A method according to claim 1, wherein a plumb line direction is determined, and the distances are measured only in an angular range around defined angles or angle sectors relative to the plumb line direction around the angles of 0°, 90°, 180° and 270°, or two perpendicular of these, the angular ranges having a dimension of 5° to 15°.

10. A positioning system, mountable on a hand-held power tool in such a way that in a mounted condition the positioning system is designed for determining the position of the tool on a wall by measuring distances within a plane perpendicular to a tooling axis in at least two directions, the positioning system comprising a calculation and storing unit for calculating relative and absolute distances and/or local coordinates, wherein:
the positioning system comprises at least one noncontact measurement sensor module designed for measuring distances in at least two directions, including at least the direction to either the floor or the ceiling and the direction to one wall adjacent to the wall, the measurement in each direction taking place in an angular range of at least 1°; and
the calculation and storing unit is designed for automatically transforming the measured distances into a function, wherein extrema represent shortest distances to the walls, the floor and/or the ceiling adjacent to the wall to be tooled, and from said function automatically deducing the shortest distances to walls, floor and/or ceiling adjacent to the wall so as to allow positioning relative to the shortest distances.

11. A positioning system according to claim 10, wherein the function is a discrete function and the extrema is a minima.

12. A positioning system according to claim 10, wherein the distances measured by the at least one measurement sensor module are measured over an angle of at least 270°.

13. A positioning system according to claim 10, wherein the distances measured by the at least one measurement sensor module are measured over an angle of at least 360°.

14. A positioning system according to claim 10, wherein at least one distance measuring device comprises at least one measurement sensor module that is designed to:
rotate around an axis parallel to the working direction, the sensor optics of the rotating measurement sensor modules in particular being protected by a protection cap in at least one position;
emit at least one measurement beam, which through rotation defines a plane perpendicular to the axis; and
measure the distances to the edges of said plane.

15. A positioning system according to claim 10, wherein the measurement sensor module is designed in such a way that the rotation is generated either:
manually;
by the motor of the hand-held power tool, comprising:
a certain speed mode; or
a gear for adapting the speed to the needs of distance measurements; or
by a motor independent from the motor of the handheld power tool;
a ring piezo drive;
a direct drive; or
any other hollow core axis motor; and/or
the positioning system comprises at least two measurement sensor modules that are positioned eccentrically relative to the tooling axis, each comprising a rotating mirror element, which covers an angle of at least 360° divided by the number of those modules.

16. A positioning system according to claim 15, further comprising a gravity sensitive device for detection of the plumb line direction.

17. A positioning system according to claim 15, wherein the positioning system comprises a gravity sensitive device for detection of the plumb line direction, and the measurement of the distances to the edges of the plane is restricted to segments around selected angles relative to the plumb line direction.

18. A positioning system according to claim 15 wherein the positioning system comprises a gravity sensitive device for detection of the plumb line direction, and the measurement of the distances to the edges of the plane is restricted to segments around selected angles relative to the plumb line direction around the angles of 0°, 90°, 180° and 270°, or two perpendicular of these, the segments having a dimension of 1° to 5°.

19. A positioning system according to claim 10, wherein four measurement sensor modules that are positioned eccentrically relative to the tooling axis and designed to be rotationally adjustable in a plane perpendicular to the tooling axis.

20. A positioning system according to claim 10, wherein four measurement sensor modules that are positioned eccentrically relative to the tooling axis and designed to be rotationally adjustable in a plane perpendicular to the tooling axis manually.

21. A positioning system according to claim 10, wherein:
the measurement beam emitted by the at least one measurement sensor module is optically visible; and/or
the positioning system comprises:
a circular bubble;
a pluggable frame with at least three points, which are arranged in such a way on the front end of the frame that the tooling axis is aligned perpendicularly to a wall when all points are in contact with the surface of this wall; and/or
an aspirator for withdrawing dust from the at least one distance measuring device and/or the at least one measurement sensor module.

22. A positioning system according to 10, wherein:
the measurement sensor module is designed in such a way that it can perform a vertical scan to a side wall, measuring distances to points on at least one line segment of this wall; and the positioning system is designed to determine:
   shortest distances to each line segment; and
   from these shortest distances a nearest line segment;
by performing a multitude of vertical scans to a multitude of parallel line segments when the tool is pivoted around a vertical axis or with a two-dimensional scan of the measurement sensor module, and
the positioning system is designed to determine an angle between the tooling axis and the direction of the shortest distance to the nearest line segment, and
output means provide information about the angle between the tooling axis and the direction of the shortest distance to the nearest line segment.

23. A positioning system according to claim 10, comprising one or more of the following:
   a display unit comprising means for displaying a 2D cross-sectional view;
   input means;
   acoustical output means;

24. A positioning system according to claim 12, the input means allowing one or more of the following:
   loading a local coordinate system;
   setting a reference point of a locally defined coordinate system;
   defining arbitrary coordinate systems in the measuring plane; and
   inputting design data, particularly line or grid values.

25. A positioning system according claim 10, being designed as an upgrade kit that is mountable on a hand-held power tool.

26. A positioning system according claim 25, wherein the positioning system is releasably mountable with a quick release.

27. A hand-held power tool comprising a positioning system according claim 10, the positioning system being mounted on the tool.

* * * * *